US012172451B2

(12) United States Patent
Choi et al.

(10) Patent No.: US 12,172,451 B2
(45) Date of Patent: Dec. 24, 2024

(54) HEAD ASSEMBLY FOR INK-JET PRINTER AND INK-JET PRINTER HAVING THE SAME

(71) Applicant: GOSANTECH CO., LTD., Cheonan-si (KR)

(72) Inventors: Yunseok Choi, Cheonan-si (KR); Jihee Boo, Cheonan-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 111 days.

(21) Appl. No.: 17/969,348

(22) Filed: Oct. 19, 2022

(65) Prior Publication Data

US 2024/0001697 A1 Jan. 4, 2024

(30) Foreign Application Priority Data

Jun. 30, 2022 (KR) ........................ 10-2022-0080919

(51) Int. Cl.

*B41J 29/02* (2006.01)
*B41J 2/045* (2006.01)
*B41J 2/14* (2006.01)

(52) U.S. Cl.

CPC ........... *B41J 29/02* (2013.01); *B41J 2/04586* (2013.01); *B41J 2/14* (2013.01); *B41J 2202/20* (2013.01)

(58) Field of Classification Search

CPC . B41J 29/02; B41J 2/04586; B41J 2/14; B41J 2202/20; B41J 2/175; B41J 2/1752; B41J 2/17553

See application file for complete search history.

(56) References Cited

FOREIGN PATENT DOCUMENTS

| | | | | | |
|---|---|---|---|---|---|
| KR | 10-0654839 | B1 | | 12/2006 | |
| KR | 10-2021-0070281 | A | | 6/2021 | |
| WO | WO-2006116318 | A2 | * | 11/2006 | ............... B05C 5/00 |
| WO | 2018/074258 | A1 | | 4/2018 | |
| WO | WO-2020065208 | A1 | * | 4/2020 | .......... B25J 17/0283 |

OTHER PUBLICATIONS

Elaarag Hossam, Ink-Jet Printing Module for Printing Robot, Magazine for These Modules, and Ink-Jet Printing Method Using This Robot (WO 2020065208 A), Apr. 2, 2020, Abstract and Detailed Description (Year: 2020).*

Albertalli David et al., Printable Substrate and Nozzle Alignment System, Nov. 2, 2006, [Abstract and Paragraphs 0053, 0056, 0086-0087]. (Year: 2006).*

Office Action issued Mar. 26, 2024 in Korean Application No. 10-2022-0080919.

* cited by examiner

*Primary Examiner* — Lisa Solomon

(74) *Attorney, Agent, or Firm* — Sughrue Mion, PLLC

(57) ABSTRACT

Proposed is a head assembly for an ink-jet printer. The head assembly includes a head module including a head discharging ink and a reservoir storing the ink, a fixing portion including a pressure controller configured to control a gas pressure, the fixing portion including a control driver configured to control the head, and includes a stage frame on which the head module and the fixing portion are mounted, the stage frame being connected to a moving device. The head module is capable of being attached to and detached from the stage frame, and connecting portions are formed on portions where the head module and the stage frame contact, so that a pipe and a wiring formed on the head module are connected to a pipe and a wiring which are connected to the fixing portion and which are inserted into or passing through the stage frame.

14 Claims, 9 Drawing Sheets

HEAD ASSEMBLY FOR INK-JET PRINTER AND INK-JET PRINTER HAVING THE SAME

CROSS REFERENCE TO RELATED APPLICATION

The present application claims priority to Korean Patent Application No. 10-2022-0080919, filed Jun. 30, 2022, the entire contents of which are incorporated herein for all purposes by this reference.

BACKGROUND OF THE INVENTION

Field of the Invention

The present disclosure relates to a head assembly for an ink-jet printer and an ink-jet printer having the head assembly. More particularly, the present disclosure relates to a head assembly which is for industrial use and in which an ink is capable of being replaced, and to an ink-jet printer having the head assembly.

Description of the Related Art

Currently, in industrial fields, a device that discharges liquid is used for various purposes. For example, liquid is discharged on the desired position to form a pattern for a purpose of forming a specific shape such as an electric circuit and so on. Furthermore, liquid is thinly discharged in order to manufacture a thin fiber, or liquid is discharged on a surface of a target object of coating in order to coat the surface of the target object of coating.

An ink-jet printing method of ejecting liquid ink on a surface of a medium in the form of droplets according to a shape signal is used not only for printing of documents and leaflets but also for solution processing in the industrial fields of semiconductors or displays.

An application range of ink-jet printing which can form a complicated pattern on a substrate or accurately discharge ink on a specific position has been expanding. A small ink-jet printer for document printing has the form in which ink is stored in an ink-jet head that discharges ink droplets. However, a large document printer or an industrial-use ink-jet printer uses a large amount of ink, and a structure in which an ink storage portion and an ink-jet head are separated from each other is applied thereto.

In order to discharge an exact amount of ink in the ink-jet printing process, it is necessary to maintain the ink in a meniscus state in which the surface of the ink ready for ejection from the ink-jet head has a concave shape due to a capillary phenomenon with respect to a nozzle inlet. To this end, in order to prevent the ink from flowing down in the ink-jet head such that the meniscus state is maintained, it is typical to position the storage portion for supplying the ink to the head higher than that of the ink-jet head and to generate a negative pressure inside the storage portion for supplying the ink to the head by maintaining the storage portion for supplying the ink to the head to be in a vacuum state.

As such, in an industrial-use ink-jet printing apparatus, a head portion on which a nozzle that discharges liquid is mounted includes an ink-jet head, a storage portion for supplying ink to the ink-jet head, a pressure control device for maintaining the storage portion and the ink-jet head to be in vacuum states, and a control portion controlling discharged droplets, and generally one module is constituted by coupling such components.

Modularization of the head portion is to constitute one module unit by fixing above-described components to a housing having a specific shape or to a specific position of a housing.

In addition, when the head portion has a modularized shape, there are advantages that degree of precision of working is increased and the apparatus is capable of being managed in units of modules. However, when the head portion that is modularized is required to be temporarily separated due to reasons such as repair and management are required to be performed, another type of ink is required to be used, and so on, a problem occurs during a process of storing the head module having an increased size.

Recently, in the industrial atmosphere which is changed from mass production of limited items in the past into small quantity production of diverse items capable of increasing diversity of products, a function capable of performing various processes while changing ink to be used is demanded in the industrial-use ink-jet printer. Furthermore, with the small quantity production of diverse items, as the demand for the production of various prototypes increases compared to a conventional technology, research on an ink-jet printer in which various inks are replaced and used for manufacturing prototypes and for experimenting is continuing. As described above, when entire of the head portion is modularized, there is a disadvantage that such demands cannot be satisfied.

DOCUMENT OF RELATED ART (Patent Document 1) Korean Patent Application Publication No. 10-2021-0070281

SUMMARY OF THE INVENTION

Accordingly, the present disclosure has been made keeping in mind the above problems occurring in the related art, and an objective of the present disclosure is to provide an ink-jet printer having a shape that is capable of satisfying demands for using various inks while maintaining an advantage of modularization.

In order to achieve the above objective, according to the present disclosure, there is provided a head assembly for an ink-jet printer, the head assembly including: a head module including a head discharging ink and a reservoir storing the ink supplied to the head; a fixing portion including a pressure controller connected to the reservoir and configured to control a gas pressure such that the ink injected into the head maintains a meniscus state, the fixing portion including a control driver configured to control ink discharging of the head; and a stage frame on which the head module and the fixing portion are mounted, the stage frame being connected to a moving device and being configured to be moved, wherein the head module is configured such that the head module is capable of being attached to and detached from the stage frame, and connecting portions are respectively formed on portions where the head module and the stage frame contact, so that a pipe and a wiring formed on the head module are connected to a pipe and a wiring which are connected to the fixing portion by coupling the connecting portions and which are inserted into or passing through the stage frame.

A linear motion member capable of performing a linear reciprocating motion may be mounted on the stage frame, the head module may be mounted on the linear motion member, and whether the connecting portion of the head module and the connecting portion of the stage frame are coupled to each other or not may be determined according to a position of the linear motion member on which the head module is mounted.

The linear motion member may be a linear motion guide (LM guide).

A mounting position of the head module may be fixed by at least one of a pin that protrudes on any one of the linear motion member and the head module and by at least one of a pin hole which is formed in the other one of the linear motion member and the head module and into which the pin is inserted.

A fixing means may be provided, in which the fixing means is configured to fix the linear motion member to not be moved when the connecting portion of the head module and the connecting portion of the stage frame are in a state of being coupled to each other.

The fixing means may include: at least one of a pin that protrudes on any one of the head module and the stage frame; and at least one of a pin hole which is formed in the other one of the head module and the stage frame and into which the pin is inserted, and the fixing means may be fixed by a zero-point clamping system in which clamping is performed by a hydraulic pressure or a pneumatic pressure.

The stage frame may be divided into a weight dispersion portion and a head mounting portion in which the weight dispersion portion is positioned above a moving portion for moving the head assembly in the ink-jet printer and the head mounting portion is for mounting the head module, and the fixing portion may be mounted on the weight dispersion portion.

The weight dispersion portion may have a flat plate shape positioned above the moving portion, and the weight dispersion portion may be connected to the head mounting portion via a connecting portion that extends downward from a first side surface of the weight dispersion portion.

According to another aspect of the present disclosure, there is provided an ink-jet printer including a head assembly discharging ink and a moving portion for moving the head assembly to a discharging position, the head assembly including: a head module modularized such that a head discharging the ink and a reservoir storing the ink supplied to the head are included in the head module; a fixing portion including a pressure controller connected to the reservoir and configured to control a gas pressure such that the ink injected into the head maintains a meniscus state, the fixing portion including a control driver configured to control the head; and a stage frame on which the head module and the fixing portion are mounted, the stage frame being connected to a moving device and being configured to be moved, wherein the head module is configured such that the head module is capable of being attached to and detached from the stage frame, and connecting portions are respectively formed on portions where the head module and the stage frame contact, so that a pipe and a wiring formed on the head module are connected to a pipe and a wiring which are connected to the fixing portion by coupling the connecting portions and which are inserted into or passing through the stage frame.

A linear motion member capable of performing a linear reciprocating motion may be mounted on the stage frame, the head module may be mounted on the linear motion member, and whether the connecting portion of the head module and the connecting portion of the stage frame are coupled to each other or not may be determined according to a position of the linear motion member on which the head module is mounted.

The linear motion member may be a linear motion guide (LM guide).

A mounting position of the head module may be fixed by at least one of a pin that protrudes on any one of the linear motion member and the head module and by at least one of a pin hole which is formed in the other one of the linear motion member and the head module and into which the pin is inserted.

A fixing means may be provided, in which the fixing means is configured to fix the linear motion member to not be moved when the connecting portion of the head module and the connecting portion of the stage frame are in a state of being coupled to each other.

The fixing means may include: at least one of a pin that protrudes on any one of the head module and the stage frame; and at least one of a pin hole which is formed in the other one of the head module and the stage frame and into which the pin is inserted, and the fixing means may be fixed by a zero-point clamping system in which clamping is performed by a hydraulic pressure or a pneumatic pressure.

The stage frame may be divided into a weight dispersion portion and a head mounting portion in which the weight dispersion portion is positioned above the moving portion for moving the head assembly in the ink-jet printer and the head mounting portion is for mounting the head module, and the fixing portion may be mounted on the weight dispersion portion.

The weight dispersion portion may have a flat plate shape positioned above the moving portion, and the weight dispersion portion may be connected to the head mounting portion via a connecting portion that extends downward from a first side surface of the weight dispersion portion.

In the present disclosure constituted as described above, since the head module including the head and the reservoir is separated from the fixing portion that includes the components that are not in contact with ink and only the head module is capable of being replaced, there is an effect that overall manufacturing cost may be significantly reduced by reducing the number of components included in a replaceable head module comparing to conventional products in which components irrelevant to ink replacement are required to be modularized and manufactured in plural types.

In addition, since the head module is configured to be moved in a horizontal direction with respect to the stage frame during a process of replacing the head module, there is an effect that an electric wiring and a gas pipe are connected during a process of removing or mounting the head module by moving the head module without additionally connecting or separating connectors for the electric wiring and the gas pipe during a process of replacing the head module.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
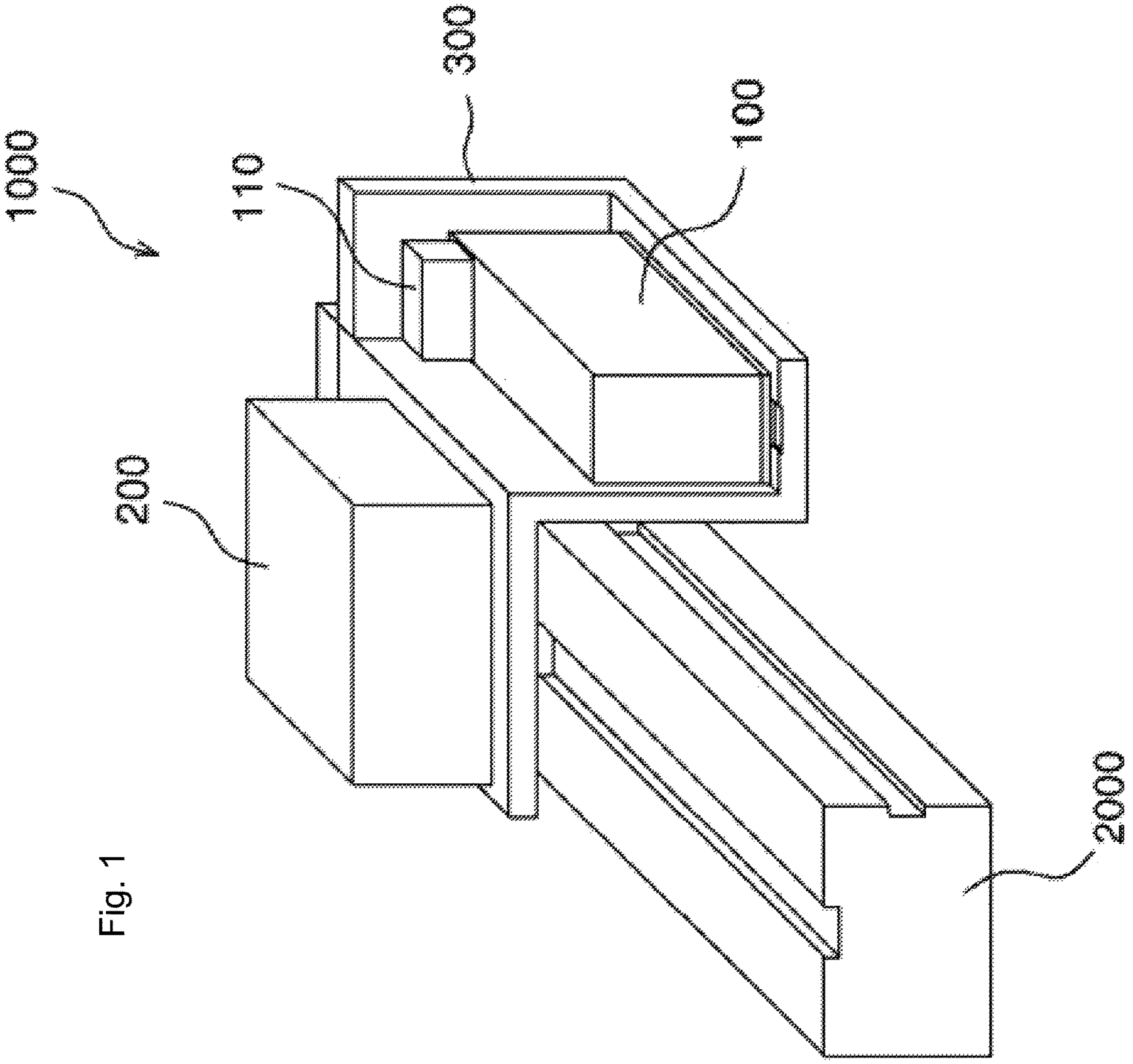
FIG. 1 is a perspective view illustrating a structure of a head assembly for an ink-jet printer according to an embodiment of the present disclosure.

Hereinafter, an embodiment of the present disclosure will be described in detail with reference to the accompanying drawings.

However, embodiments of the present disclosure may be modified in a variety of different forms, and the scope of the present disclosure is not limited to the embodiments described below. The shapes and sizes of the elements in the drawings may be exaggerated for clarity, and elements denoted by the same reference numerals in the drawings are the same elements.

Throughout the specification, it will be understood that when an element is referred to as being “connected” to another element, it can be directly connected to the other element or it can be electrically connected with the other element and intervening elements may be present therebetween. In addition, it will be further understood that when a part “comprises”, “includes”, or “has” an element, this means that other elements are not excluded but may be further included, unless otherwise stated.

Also, the terms such as “first”, “second”, etc. may be used to distinguish one element from another element, and the scope of the present disclosure must not be limited by these terms. For example, a first constitutive element may be referred as a second constitutive element, and the second constitutive element may be also referred to as the first constitutive element.

Figure 2:
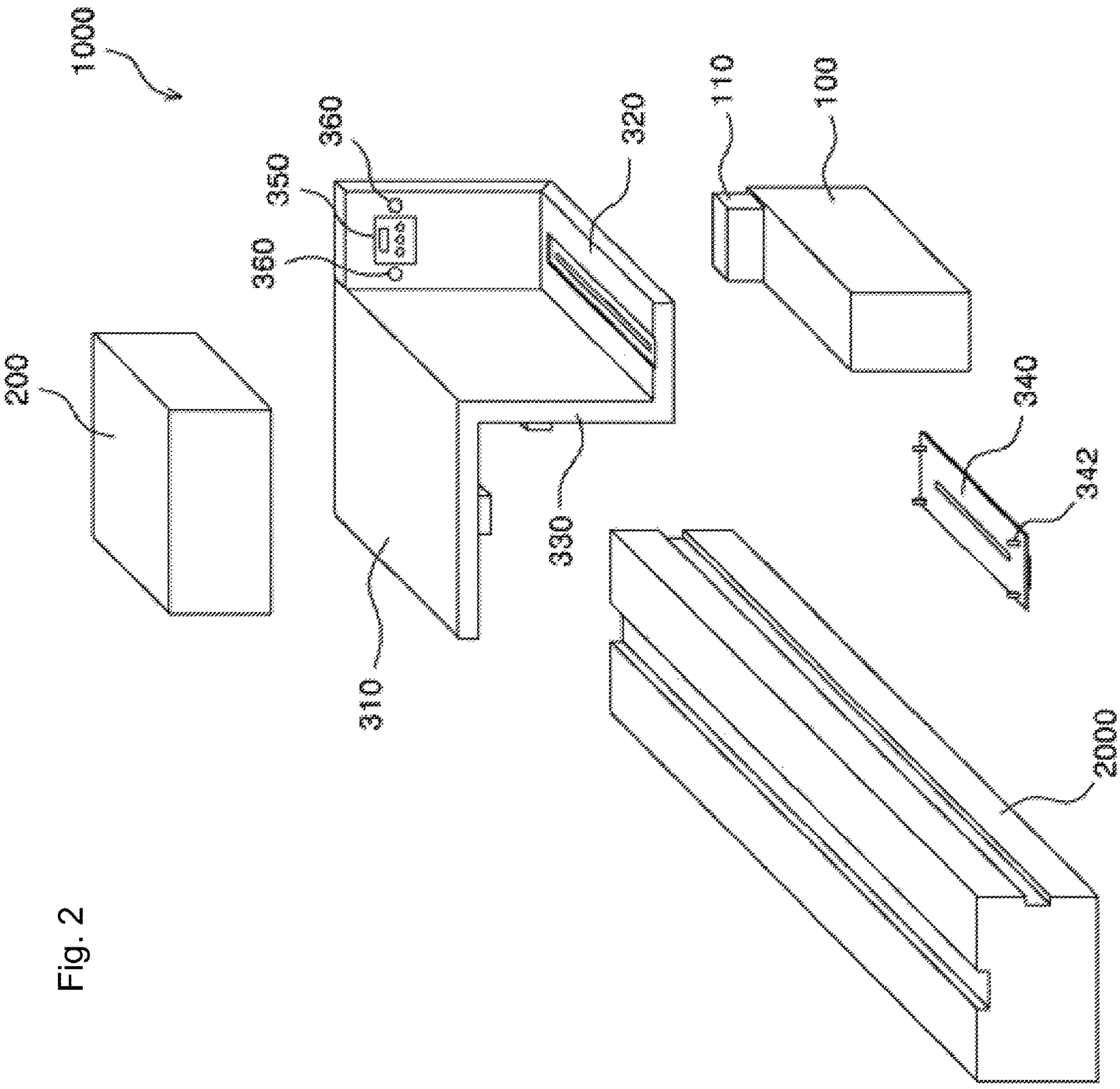
FIG. 2 is an exploded perspective view illustrating the structure of the head assembly for the ink-jet printer according to an embodiment of the present disclosure.

FIG. 1 is a perspective view illustrating a structure of a head assembly for an ink-jet printer according to an embodiment of the present disclosure, and FIG. 2 is an exploded perspective view illustrating the structure of the head assembly for the ink-jet printer according to an embodiment of the present disclosure.

A head assembly 1000 for an ink-jet printer of the present disclosure includes a head module 100, a fixing portion 200, and a stage frame 300.

The head module 100 includes a head on which a nozzle that discharges an ink is formed, and includes a reservoir storing the ink supplied to the head. Preferably, the head module 100 is modularized such that the head module 100 is capable of being attached to and detached from the stage frame 300.

A conventional ink-jet printer in which all of electronic device configurations including a pressure control device for maintaining a meniscus and a driver for controlling a head are modularized. However, in the present disclosure, only the minimum parts required in an ink replacement process are included in the head module 100.

The reservoir is a portion in which the ink that is supplied to the head is stored. Furthermore, in order to replace the ink from the same reservoir, a new ink is required to be filled after the reservoir is completely emptied and cleaning of an inner portion of the reservoir is finished. Therefore, replacing the reservoir in a state in which an ink is filled is more preferable. In addition, the ink remains in the head. Therefore, replacing the head is preferable since the head is required to be completely cleaned in order to replace the ink with another ink. As such, the present disclosure has a characteristic that the head module 100 capable of easily replacing elements related to a storage and a circulation of an ink is provided.

The ink-jet printer in which the present disclosure is applied is configured for the purpose of being used for industrial use. Therefore, preferably, the head includes a plurality of nozzles, and is separated from the reservoir.

All of the technical configurations of an ink-jet head conventionally used may be applied within a range that does not impair the characteristics of the present disclosure, and may be applied in various forms.

The reservoir is connected to the head via a pipe and supplies the ink to the head. At this time, it is preferable that the reservoir includes a supply pipe supplying the ink toward the head and a collecting pipe through which the ink is collected from the head, rather than having a one-way structure in which the reservoir only supplies the ink toward the head.

In a structure in which the supply pipe that supplies ink to the head from the reservoir is only provided, it is difficult to maintain a meniscus state since a pressure in the inner portion of the reservoir is severely changed during a process of discharging ink from the head. In addition, since ink is moved toward the head only by the amount of ink ejected, the amount of time the ink remains stationary increases, so that problems such as separation of ink components due to weight difference, subsidence of particles contained in ink, and so on may occur.

When the supply pipe supplying ink to the head and the collecting pipe collecting the ink to the reservoir from the head are all provided, ink except for discharged ink is capable of being circulated by moving the ink to the collecting pipe, so that there is an effect that the occurrence of the problems described above may be reduced.

If a special problem does not occur even if only the supply pipe is provided, it is also possible to provide only the supply pipe. Furthermore, the technical configurations for connecting the reservoir to the ink-jet head conventionally used may be applied in a range that does not impair the characteristics of the present disclosure, and may be applied in various forms.

For example, a circulation structure such as a pump for a forced circulation of ink may be applied in at least one of the supply pipe and the collecting pipe, and a bypass pipe may be added such that ink is capable of bypassing and moving in a specific situation.

In addition, all of the technical configurations of the reservoir conventionally used may be applied within a range that does not impair the characteristic of the present disclosure in which the head and the reservoir are modularized, and may be applied in various forms.

For example, a configuration for stirring ink such that components of the ink stored in the reservoir do not separate and particles contained in the ink do not subside may be added. In addition, a configuration for removing microbubbles generated during a process of injecting ink into the reservoir or a process in which ink is supplied or circulated to the head may be applied. Furthermore, in order to prevent changes in an internal pressure occurring during the process of injecting ink into the reservoir, a buffer reservoir in which the ink injected into the reservoir is temporarily stored may be provided. Meanwhile, when the size of the reservoir is excessively large, the meniscus state is difficult to be maintained. Therefore, the reservoir may be configured such that the size of the reservoir is reduced and ink stored in a separate ink storage tank is continuously supplied to the reservoir. At this time, the ink storage tank may be positioned inside the head module, or may be positioned outside the head module and may have a structure in which ink is supplied to the reservoir or the buffer reservoir through a pipe.

The head module 100 of the head assembly for the ink-jet printer according to the present disclosure is modularized such that the head module 100 is capable of being attached to and detached from the stage frame 300, and includes a head connecting portion 110 that is configured to be connected to the fixing portion 200 via a pipe and a wiring only when the head module 100 is attached to the stage frame 300. A detailed description of the head connecting portion 110 will be described later.

In the present disclosure, the fixing portion 200 includes all components that are not included in the head module 100 including the minimum components required in ink replacement process. Typically, electronic devices such as a pressure control device controlling a gas pressure inside the reservoir so as to maintain the meniscus state of the head, a head driver controlling an operation of the head, and so on are included in the fixing portion 200.

As described above, in order to replace ink, replacing the components which are in contact with ink or to which ink is moved is preferable while the components is in a state in which ink is stored, but other components are capable of being applied regardless of the ink replacement.

At this time, as in the conventional configuration, when one module including the pressure control device controlling the gas pressure and the head driver is configured, the pressure control device and the head driver are included in each of a plurality of modules used for the ink replacement, so that there is a problem that manufacturing cost and operating cost are increased. In addition, the volume and the weight of the module that is separated from the ink-jet printer for ink replacement are increased, so that there are problems that a process of storing and moving the module becomes difficult and a cost of performing the process is increased.

Accordingly, in the present disclosure, components irrelevant to ink replacement are included in the fixing portion 200 and are mounted on the stage frame 300. At this time, the components included in the fixing portion 200 do not have to be replaced during in ink replacement process unlike the head module 100, so that the components are not forced to be modularized. In addition to the pressure control device and the head driver device, components that can be used regardless of ink replacement may be included in the fixing portion 200 without being specifically limited.

Meanwhile, the pressure control device controlling the gas pressure is required to be connected to the reservoir via a gas pipe, and the head driver device is required to be connected to the head via an electric wiring. At this time, when the pipe between the reservoir and the pressure control device and the wiring between the head and the head driver device are directly connected, there is a problem that a process in which the pipe and the wiring are separated and are fastened again during a process of replacing the head module 100 becomes complicated even if the head module 100 is configured to be detachable. Accordingly, in order to easily connect and separate the pipe and the wiring, in the present disclosure, a connecting portion corresponding to the head connecting portion 110 as described above is applied, but the connecting portion is not formed on the fixing portion 200 but formed on the stage frame 300, which will be described in more detail later.

All technical configurations that are conventionally used may be applied in the pressure control device, the head driver device, and so on that are included in the fixing portion 200 within a range that does not impair the characteristics of the present disclosure, and may be realized in various forms.

The stage frame 300 is a component for constituting a single head assembly 1000 by mounting the head module 100 and the fixing portion 200 on the stage frame 300.

The reason of modularizing the components related to the head conventionally includes the purpose for preventing a problem from occurring when only the head is moved during an ink-jet printing process due to various liquid pipes, gas pipes, and wirings connected to the head. At this time, in the present disclosure, components are separated into the head module 100 capable of being entirely replaced for ink replacement and the fixing portion 200 that is not included in the head module 100. However, in order to move the head module 100 and the fixing portion 200 together as one, the single head assembly 1000 is constituted by mounting the head module 100 and the fixing portion 200 on the stage frame 300.

The stage frame 300 is a component for mounting the fixing portion 200 and the head module 100, but the fixing portion 200 is a portion that is not replaced during ink replacement process, so that the fixing portion 200 is capable of being mounted and fixed by applying various methods without being specifically limited. In contrast, the head module 100 requires components that allow the head module 100 to be capable of being attached to and detached from the stage frame 300.

In the embodiment, a process of attaching and detaching the head module 100 on the stage frame 300 is configured to be performed by a linear motion guide (LM guide) that performs a linear reciprocating motion. As described above, the head and the reservoir included in the head module 100 are connected to the head driver device and the pressure control device included in the fixing portion 200 via the wiring and the pipe, and the connecting portion is provided so that the separation and connection of the wiring and the pipe are capable of being easily performed during the process of replacing the head module 100 for the ink replacement. A frame connecting portion 360 that corresponds to the head connecting portion 110 formed on the head module 100 is formed on the stage frame 300, and the frame connecting portion 360 is formed on a position corresponding to a position of the head connecting portion 110 when the head module 100 is attached to the stage frame 300. At this time, in the present disclosure, the head module 100 is configured to perform the linear reciprocating motion during the process of attaching and detaching the head module 100 on the stage frame 300 such that a process in which the head connecting portion 110 is naturally connected to or separated from the frame connecting portion 360 during the process of attaching and detaching the head module 100. Furthermore, in the embodiment, the LM guide as a component that allows the head module 100 to be capable of being attached to and detached from the stage frame 300 is applied.

The head connecting portion 110 and the frame connecting portion 360 include a pipe connector for connecting the gas pipe and a wiring connector for connecting the electric wiring. Furthermore, the pipe connector and the wiring connector may be realized in various forms, but generally linear motion is often required to the connectors in order for the connectors to be accurately coupled or separated. For example, a structure of connecting the wiring by coupling a female connector formed of a plurality of pin holes into which a plurality of pins that protrude and constitutes a male connector is inserted is applied in the wiring connector. At this time, during a process of inserting the pins of the male connector pin into the pin holes of the female connector, a process in which the connector is linearly moved is required. In the embodiment, as an element for attaching and detaching the head module 100 on the stage frame 300, the LM guide that performs the linear reciprocating motion is applied. Furthermore, the pipe connector and the wiring connector are coupled to each other when the head module 100 is moved to a mounting position by performing the linear motion, and the pipe connector and the wiring connector are separated from each other when the head module 100 is separated from the mounting position by performing the linear motion, so that the process of attaching and detaching the head module 100 and the process of connecting and separating the connector are performed at the same time.

Particularly, a plurality of pins 342 is mounted on a sliding plate 340 that performs the linear reciprocating motion on the LM guide, and pin holes (not illustrated) are formed on positions corresponding to the positions of the plurality of pins 342, so that the head module 100 is capable of being mounted on a position where the head connecting portion 110 and the frame connecting portion 360 are accurately coupled to each other. In addition, a through-hole aligned with a nozzle position of the head module 100 is formed in the sliding plate 340, the nozzle is exposed downward. Furthermore, another through-hole is formed in the stage frame 300 by being aligned with the through-hole of the sliding plate 340 and the nozzle position of the head module 100 when the sliding plate 340 is positioned at the position where the head module 100 is coupled, so that the nozzle is exposed downward.

Furthermore, in the embodiment, as a fixing member fixing the head module 100 that performs the linear reciprocating motion on the LM guide to be fixed at a position where the wiring connector and the pipe connector are completely coupled, a zero-point clamping system in which clamping is performed by a hydraulic pressure or a pneumatic pressure is applied. The zero-point clamping system includes a pin member 352 and a pin hole member 350, and is a device capable of fixing the pin member 352 by using a hydraulic pressure or a pneumatic pressure such that the pin member 352 is prevented from separating while the pin member 352 is in a state in which the pin member 352 is inserted into the pin hole member 350.

In addition, the frame connecting portion 360 that corresponds to the head connecting portion 110 is positioned at the stage frame 300, but the wiring and the pipe that are connected to each other by connectors are connected to the head driver device and the pressure control device that are included in the fixing portion 200. At this time, the wiring and the pipe that are connected to the frame connecting portion 360 may be laid and positioned inside the stage frame 300, or may be connected to the frame connecting portion 360 by passing through the stage frame 300.

Meanwhile, as described above, since the stage frame 300 is a configuration for moving the head assembly 1000 together with the stage frame 300, the stage frame 300 is coupled to a moving portion 2000 that moves a position of the head assembly 1000 so as to change an ink discharge position during the ink-jet printing process.

At this time, in the embodiment, in order to realize a weight dispersion, the stage frame 300 is divided into a weight dispersion portion 310, a head mounting portion 320, and a connecting portion 330. The head of the ink-jet printer is not capable of being positioned above the moving portion 2000 due to characteristics of the head discharging ink downward, and it is preferable that the head is positioned at a side of the moving portion 2000 so that the discharge of ink is not disturbed by the moving portion 2000. Therefore, conventionally, a module is generally attached to a side surface of a moving portion when overall elements of a head are modularized, but there is a problem that a weight of the module is concentrated to one side of the moving portion. To solve this problem, when a shape of the module is changed, there is a problem that manufacturing and managing of the module become difficult.

In contrast, in the present disclosure, since the elements are separated into the head module 100 and the fixing portion 200, and the head module 100 and the fixing portion 200 are mounted on the stage frame 300, the weight dispersion may be realized by the structure of the stage frame 300. Specifically, the weight dispersion portion 310 where the fixing portion 200 is mounted is positioned above the moving portion 2000, the head mounting portion 320 where the head module 100 is mounted is positioned at a side surface of the moving portion 2000, and the stage frame 300 is configured such that the weight dispersion portion 310 and the head mounting portion 320 are connected with the connecting portion 330. In the embodiment, the connecting portion 330 connecting the weight dispersion portion 310 and the head mounting portion 320 is disposed in a vertical direction, but is not limited thereto. Furthermore, if the weight dispersion is realized by the head mounting portion 320 and the weight dispersion portion 310 and the head mounting portion 320 and the weight dispersion portion 310 are connected to each other, various modifications are capable of being realized within a range that does not impair the characteristics of the present disclosure.

Hereinafter, structures of the head connecting portion and the frame connecting portion will be described in detail with reference to the accompanying drawings.

Figure 3:
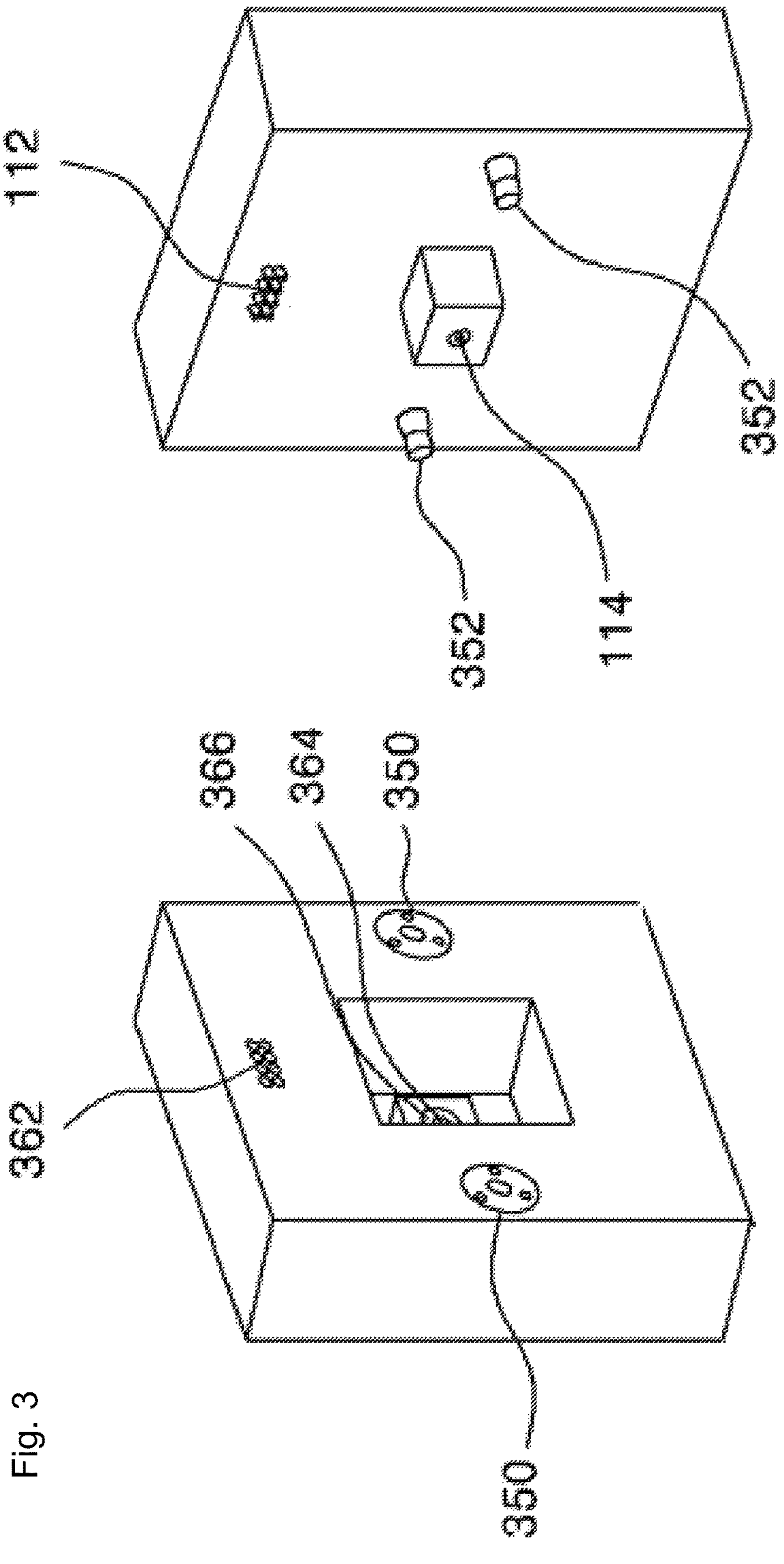
FIG. 3 is a view illustrating a head connecting portion and a frame connecting portion that are applied in the head assembly for the ink-jet printer according to an embodiment of the present disclosure.
Figure 4:
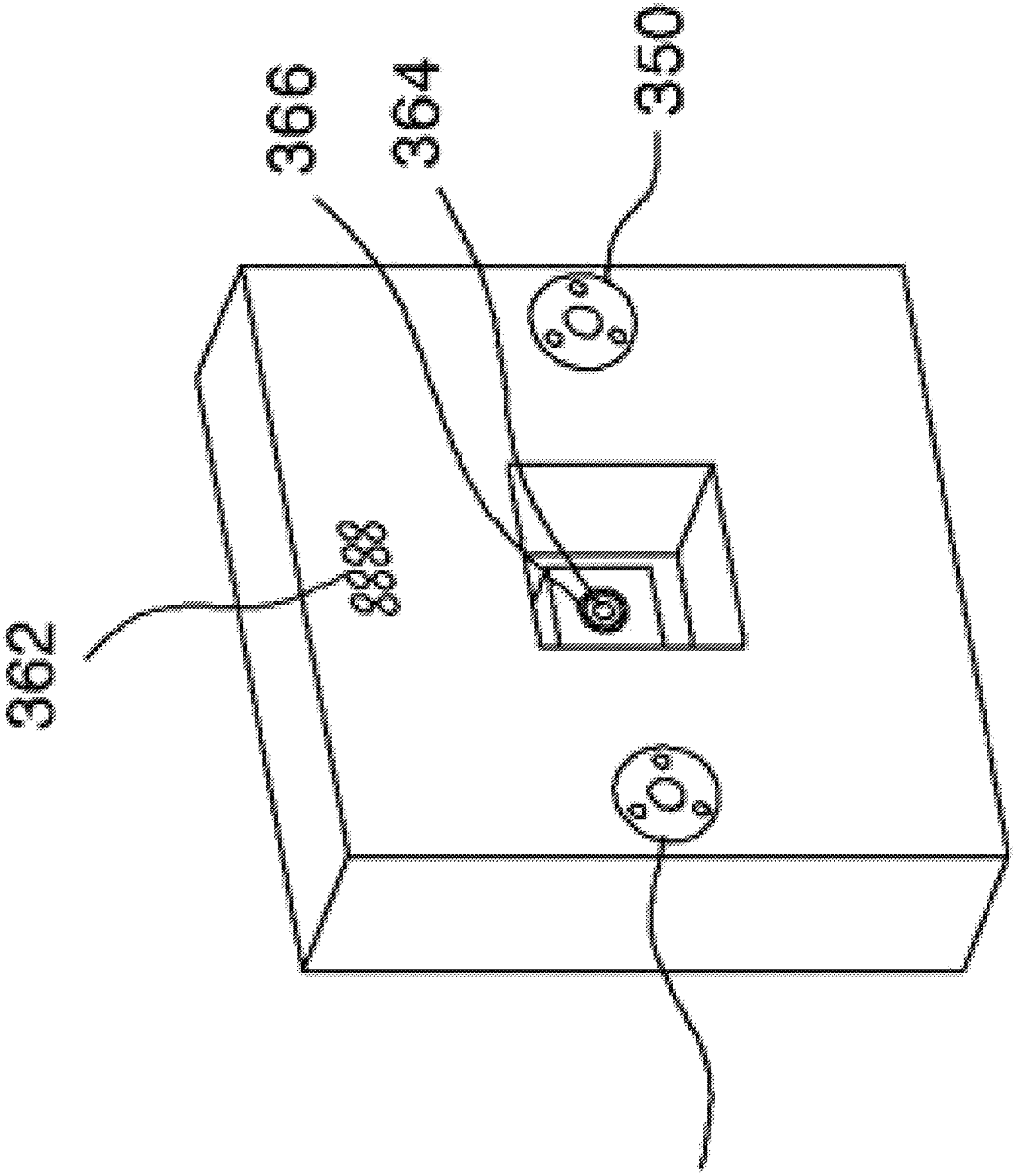
FIG. 4 is a view illustrating the frame connecting portion applied in the head assembly for the ink-jet printer according to an embodiment of the present disclosure.
Figure 5:
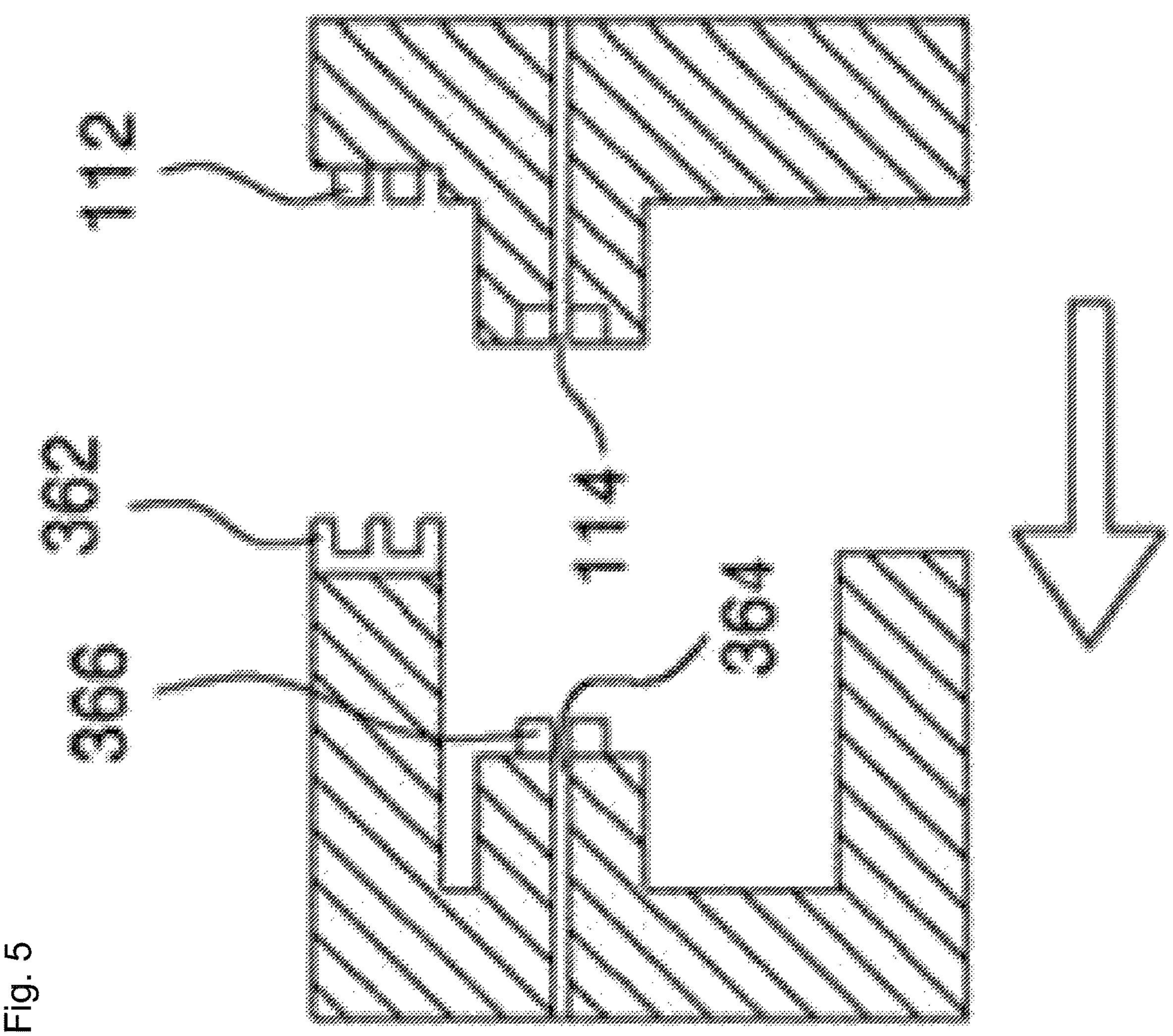
FIG. 5 is a cross-sectional view illustrating the head connecting portion and the frame connecting portion that are applied in the head assembly for the ink-jet printer according to an embodiment of the present disclosure.

FIG. 3 is a view illustrating a head connecting portion and a frame connecting portion that are applied in the head assembly for the ink-jet printer according to an embodiment of the present disclosure, FIG. 4 is a view illustrating the frame connecting portion applied in the head assembly for the ink-jet printer according to an embodiment of the present disclosure, and FIG. 5 is a cross-sectional view illustrating the head connecting portion and the frame connecting portion that are applied in the head assembly for the ink-jet printer according to an embodiment of the present disclosure.

The head connecting portion 110 is formed on the head module 100, and includes a first wiring connector 112 and a first pipe connector 114 so that the electric wiring and the gas pipe of the head module 100 are connected to the fixing portion 200 only when the head module 100 is attached to the stage frame 300.

As the first wiring connector 112, various connectors for connecting the electrical wiring sending and receiving electricity may be applied without limitation, and a male connector structure having a protruding shape that is generally used may be applied. An electric wiring connector using a male connector and a female connector has an advantage that the electric wiring is connected with a stable connection, but has a disadvantage that the electric wiring is fastened only when the electric wiring is coupled by performing a linear motion in a specific direction. Such a disadvantage does not become a problem when a separate connector connected to a flexible electric wire is provided and a person directly plugs and connects the separate connector. However, when the separate connector is not used as described in the embodiment and the connector formed on a first side of the head module 100 is used, the disadvantage of being difficult to be coupled is largely magnified. Accordingly, a connector directly formed on a surface of an entirely moving body has a specific shape, but a contact failure may easily occur on a simple contact connector, and structures specially developed for a stable connection regardless of a fastening direction have a problem of increasing manufacturing cost. However, in the embodiment, during the process of mounting the head module 100 on the stage frame 300, the LM guide that allows the head module 100 to be moved in a linear direction is applied, so that the structure using the female connector and the male connector that are generally used in the connection of the electric wiring may be applied in various forms. In the embodiment, the male connector structure is applied in the head connecting portion 110 formed on the head module 100, but is not limited thereto, and the male connector may be disposed on the frame connecting portion 360.

The first pipe connector 114 is configured to couple the gas pipe that is connected to a gas pressure control device for applying a negative pressure to the reservoir and the ink-jet head that are included in the head module 100, and various structures for connecting the gas pipe may be applied without limitation within a range that does not impair the characteristics of the present disclosure.

The frame connecting portion 360 is formed on the stage frame 300, and includes a second wiring connector 362 and a second pipe connector 364 so that the electric wiring and the gas pipe of the fixing portion 200 are connected to the head module 100 only when the head module 100 is coupled to the stage frame 300.

The second wiring connector 362 and the second pipe connector 364 of the frame connecting portion 360 are formed at positions corresponding to the positions of the first wiring connector 112 and the first pipe connector 114 that are formed on the head module 100. In addition, the second wiring connector 362 and the second pipe connector 364 have structures corresponding to the structures of the first wiring connector 112 and the first pipe connector 114.

As described in the first wiring connector 112, an electric wiring structure that is generally used may be applied in the second wiring connector 362. Specifically, in the embodiment, the first wiring connector 112 is configured as the male connector, and the second wiring connector 362 is configured as the female connector that corresponds to the male connector.

As described in the first pipe connector 114, a gas pipe connection structure that is generally used may be applied in the second pipe connector 364. Furthermore, in the embodiment, an O-ring for increasing a sealing performance at a portion where the gas pipe is connected is applied on the second pipe connector 364. A mounting position of the O-ring 366 is not limited to the second pipe connector 364, and the O-ring 366 may be formed on the first pipe connector 114. In addition, as a configuration for increasing the sealing performance at the portion where the gas pipe is connected, different structures in addition to an O-ring structure may be variously applied within a range that does not impair the characteristics of the present disclosure.

By the structures of the head connecting portion 110 and the frame connecting portion 360 described above, the electric wiring and the gas pipe of the head module 100 are connected to the electric wiring and the gas pipe of the fixing portion 200 during the process of mounting the head module 100 on the stage frame 300. This means that the electric wiring and the gas pipe do not have to be separated or connected additionally during the process of attaching and detaching the head module 100. As a result, unlike the conventional ink-jet head in which all components of the ink-jet head are configured as one module, despite the present disclosure is configured such that the fixing portion 200 and the head module 100 are separated and only the head module 100 is detachable, the present disclosure does not has a disadvantage that the electric wiring and the gas pipe are required to be connected and separated additionally during the process of attaching and detaching the head module 100, so that the best effect will be realized in the environment in which various inks are replaced and used.

Meanwhile, as described above, the present disclosure includes the fixing member for fixing a state in which the head module 100 is coupled to the stage frame 300. That is, the fixing member is for fixing a state in which the first wiring connector 112 and the second wiring connector 362 are coupled to each other and the first pipe connector 114 and the second pipe connector 364 are coupled to each other. In the embodiment, the zero-point clamping system in which clamping is performed by a hydraulic pressure or a pneumatic pressure is applied as the fixing member. The zero-point clamping system includes the pin member 352 and the pin hole member 350, and is the device capable of fixing the pin member 352 by using a hydraulic pressure or a pneumatic pressure such that the pin member 352 is prevented from separating while the pin member 352 is in the state in which the pin member 352 is inserted into the pin hole member 350. As illustrated in the drawings, the pin member 352 is positioned around the first wiring connector 112 and the first pipe connector 114 of the head module 100, and the pin hole member 350 is positioned around the second wiring connector 362 and the second pipe connector 364 of the stage frame 300 corresponding to the head module 100. By positioning the pin member 352 and the pin hole member 350 of the zero-point clamping system to be around the connectors, the first wiring connector 112, the second wiring connector 362, the first pipe connector 114, and the second pipe connector 364 are more stably coupled to each other, and a strong coupling force may be easily maintained by applying the zero-point clamping system.

Hereinafter, a process of replacing the head module from the stage frame will be described with reference to the drawings.

Figure 6:
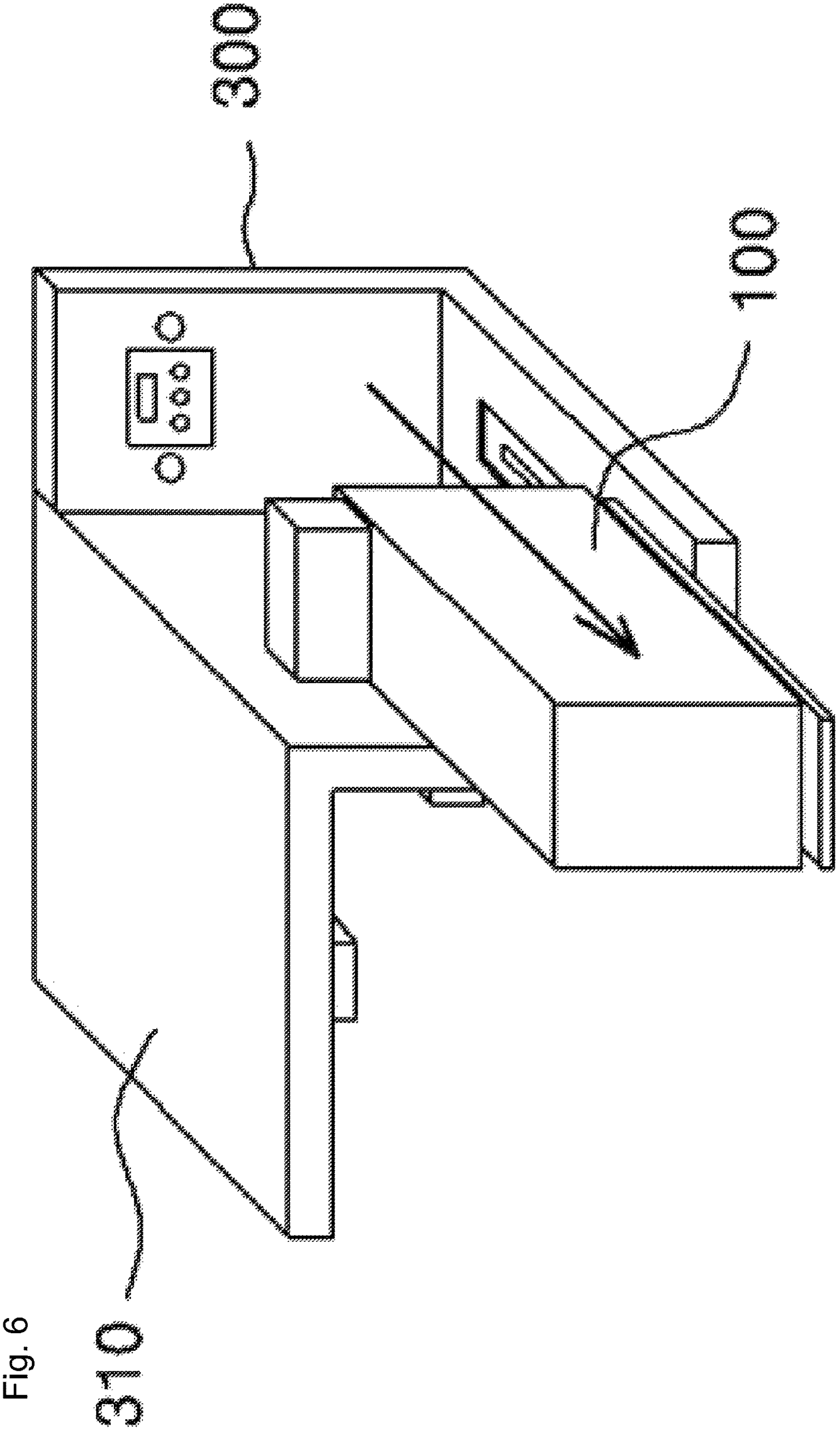
FIG. 6 is a view illustrating a state in which a connection of a head module is released from a stage frame.
Figure 7:
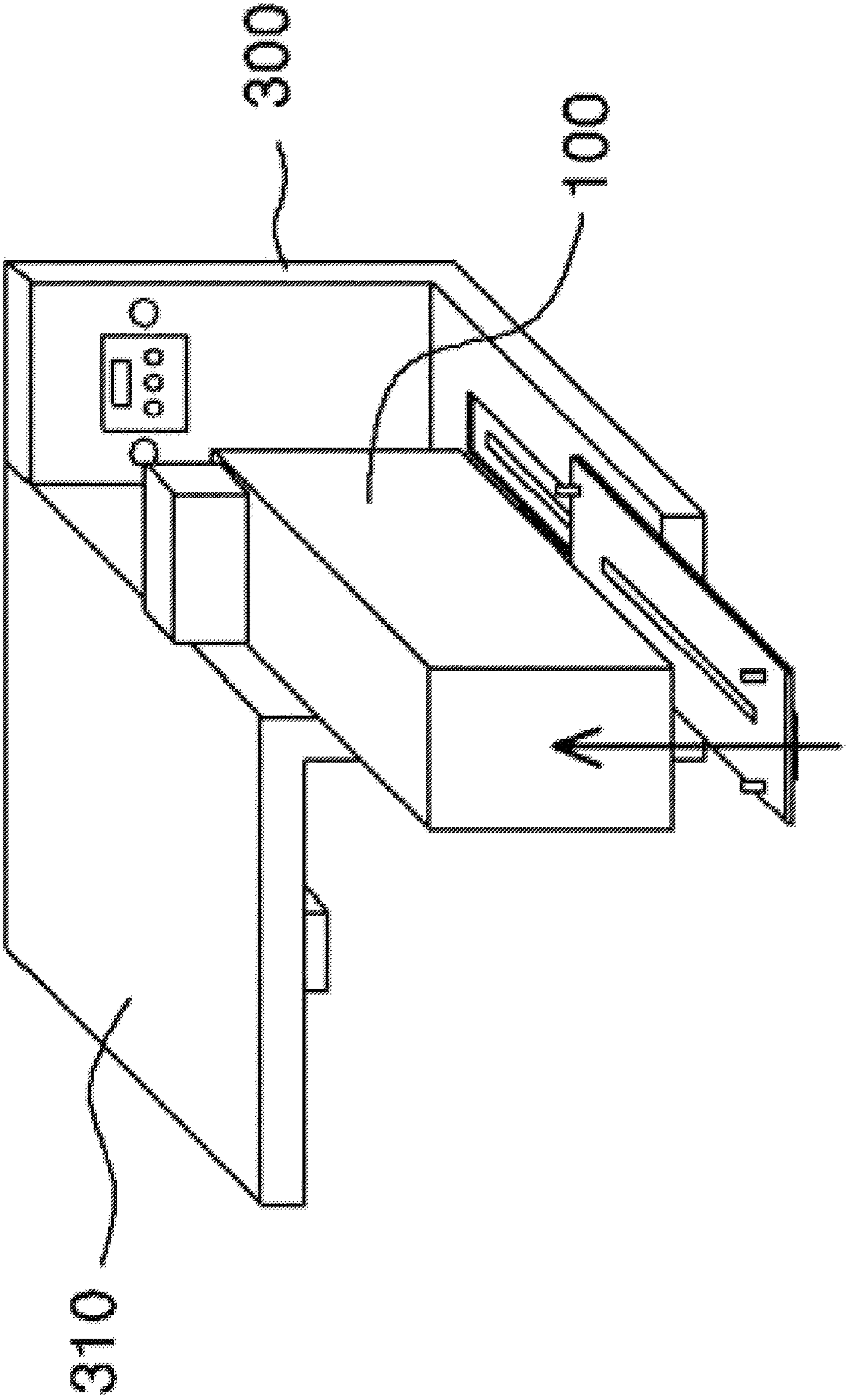
FIG. 7 is a view illustrating a state in which the head module is separated from the stage frame.
Figure 8:
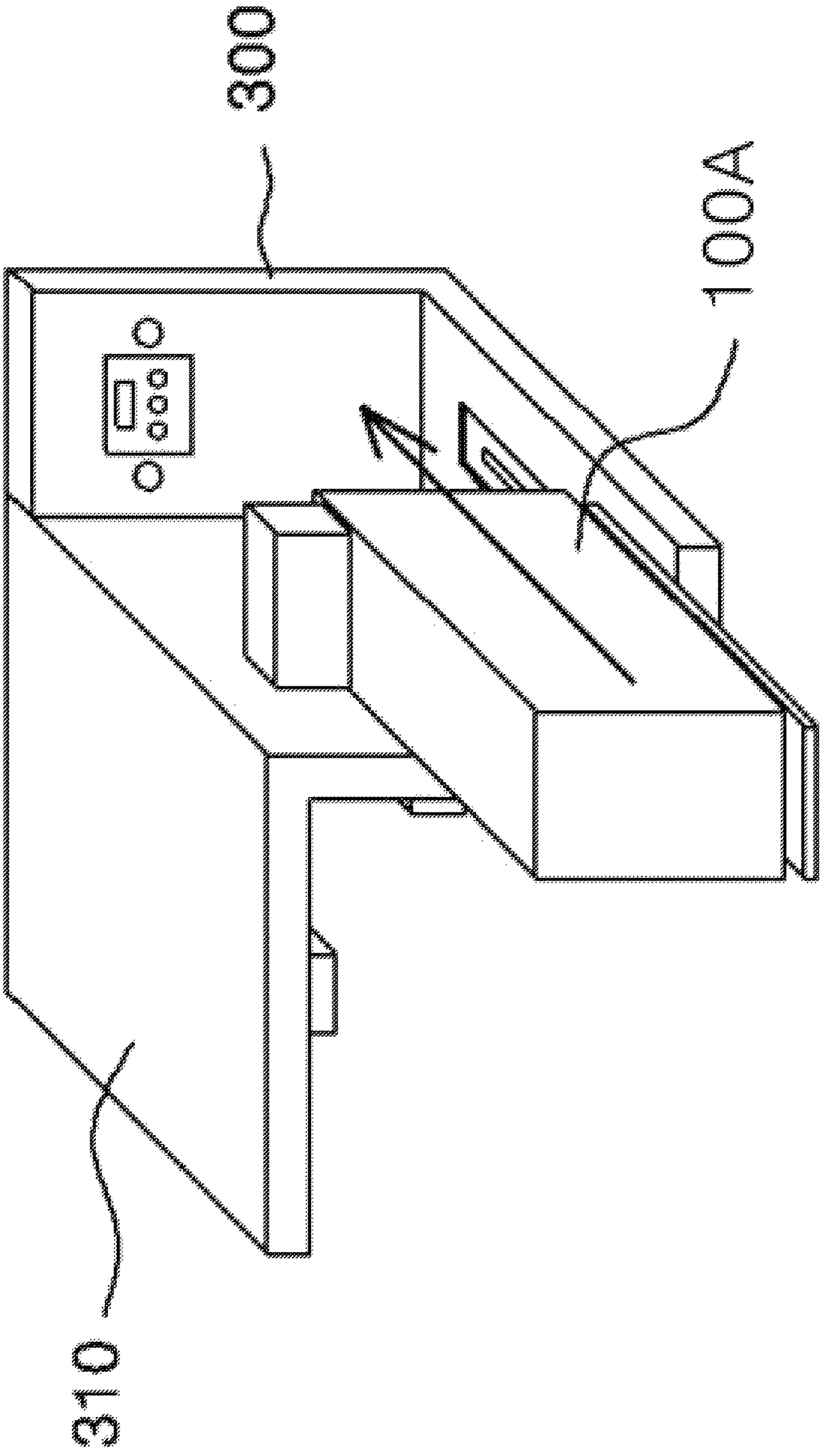
FIG. 8 is a view illustrating a state in which a new head module is coupled to the stage frame.

FIG. 6 is a view illustrating a state in which a connection of a head module is released from a stage frame, FIG. 7 is a view illustrating a state in which the head module is separated from the stage frame, and FIG. 8 is a view illustrating a state in which a new head module is coupled to the stage frame.

First, in order to release the connection of the wirings and the pipes of the head module 100 and the stage frame 300, the zero-point clamping system is unlocked so that the head module 100 is capable of being separated from the stage frame 300. Then, by moving the LM guide on which the head module 100, the head module 100 is moved in a horizontal direction, so that the wiring connector and the pipe connector are separated. At this time, as described above, when the wiring connector which has a structure generally used for connecting the electric wiring and which includes the female connector and the male connector is used, the male connector inserted into the female connector may be easily and safely separated since the head module 100 is moved in the horizontal direction. Likewise, the pipe connector is also safely separated by moving the head module 100 in the horizontal direction.

Next, in order to separate the head module 100 from the stage frame 300, the head module 100 is lifted and moved in a vertical direction. As described above, in the embodiment, the LM guide is applied so as to move the head module 100 in the horizontal direction, the plurality of pins are formed on the sliding plate so as to stably position the head module 100 to be at the accurate position, and the pin holes formed at a lower surface of the head module 100 are respectively coupled to the pins of the sliding plate, so that the head module 100 is required to be moved and lifted in the vertical direction while the head module 100 is separated.

After the head module 100 that is previously used is separated and removed, a new head module 100A is positioned such that the new head module 100A is aligned with the pins formed on the sliding plate of the LM guide, and then the head module 100 is moved in the horizontal direction by moving the LM guide, thereby coupling the wiring connector and the pipe connector. At this time, since the head module 100 is moved in the horizontal direction, the male connector is capable of being inserted into and coupled to the accurate position of the female connector even when the wiring connector including the female connector and the male connector that are generally used for connecting the electric wiring is used. During this process, the pin member of the zero-point clamping system is inserted into the pin hole member, and the pin member is fixed by a pneumatic pressure or a hydraulic pressure after when the zero-point clamping system is locked, so that the head module 100 is fixed to the stage frame 300 such that the head module 100 is not separated from the stage frame 300.

As a result, since the wiring and the pipe are connected by only moving the head module 100 in the horizontal direction along the LM guide even if the process of connecting the connectors for the wiring and the pipe is not separately performed, there is an effect that the replacement of the head module 100 for ink replacement is very easily performed.

Meanwhile, one of the reasons of difficulty in replacing ink by using the conventional technology in which overall configurations including not only the ink-jet head and the reservoir but also the gas pressure control device and the head driver are modularized is that a process such as storing and managing of the module separated from the ink-jet printer during a process of replacing and using modularized components including another ink is difficult to be performed. Since overall configurations including not only the ink-jet head and the reservoir but also the gas pressure control device and the head driver are modularized, the modularized portion has a very large size, there is a problem that a space for storing the modularized portion is required when the modularized portion is separated from the ink-jet printer, and more spaces for storing the modularized portion is required as the number of modularized portion increases. When the modularized portion separated from the ink-jet printer is transferred and stored so as to utilize a space, the modularized portion is difficult to be transferred due to an excessively large size of the modularized portion, and there is a problem that failure of sensitive components such as the gas pressure control device may occur during the transferring process. In addition, although the modularized portion separated from the ink-jet printer is required to be managed, the management of the modularized portion is difficult to be performed since the modularized portion has the excessively large size.

Specifically, a separate management or a separate transferring device could not be applied during a process of separating, managing, and transferring the modularized portion due to the excessively large size of the conventional device, and there was also a problem that a breakdown of the head positioned downward occurs. When the modularized portion is laid down and is stored and transferred so as to prevent the breakdown of the head, there was a problem that a breakdown of the gas pressure control device occurs since ink flows backward to the gas pressure control device. In addition, since ink remaining in the ink-jet head of the modularized portion that is separated leaks outside, there is are problems that the ink-jet printer and a portion around the ink-jet printer are contaminated, corrosion of surrounding components may occur as the leaked ink is vaporized, and the leaked ink may harm the human body.

In contrast, in the present disclosure, the head module constituted of the minimum number of components required for ink replacement is separated from the fixing portion, and only the head module is replaced, so that the size of the head module that is replaced is very small, thereby being capable of realizing an effect that all processes of separating, storing, and transferring the head module become easier compared to the conventional technology.

Particularly, since the head module has the small size, a separate apparatus for storing and transferring the head module while the head module is separated is capable of being provided, the breakdown of the head positioned downward may be prevented, and the problems that occur when ink remaining inside the head leaks may be prevented.

Figure 9:
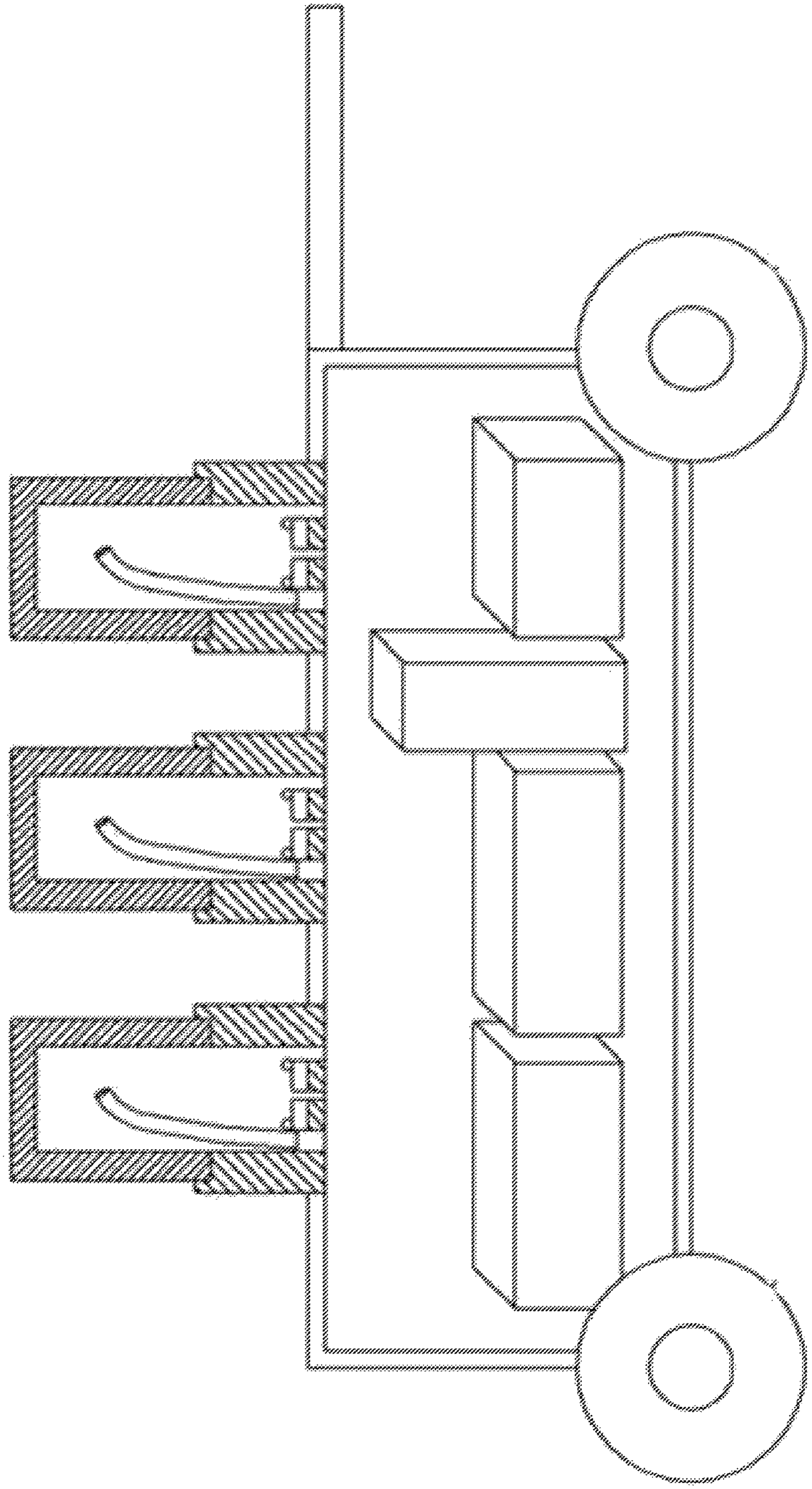
FIG. 9 is a view illustrating an apparatus for storing and transferring the head module separated from the head assembly for the ink-jet printer according to an embodiment of the present disclosure.

FIG. 9 is a view illustrating an apparatus for storing and transferring the head module separated from the head assembly for the ink-jet printer according to an embodiment of the present disclosure.

A head module mounting device that is illustrated includes a mounting portion positioned at an upper side, a device portion positioned at a lower side, and a moving device.

The mounting portion is a portion on which the head module is mounted, and a space for mounting the head module and components for managing the head module are provided in the mounting portion. Devices for managing the head module are mounted on the device portion, and the devices is connected to the mounting portion and manage the head module. The moving portion is a portion configured to move a position of the head module mounting apparatus.

The mounting portion is a housing, and includes a stand and a cover. As components for managing the head module, a nozzle suction portion, a gas suction portion, and a gas injecting portion are formed inside the stand. The stand is configured to have airtightness so that a gas inside the cover does not leak to the outside. Particularly, in a state in which the cover is mounted on the stand or the stand is closed, the airtightness is maintained between the cover and the stand so that the gas inside the cover does not leak to the outside.

The device portion includes a compressor, an ejector, a gas filter, and a waste liquid container. The compressor compresses the gas and provides the gas to the gas injecting portion of the mounting portion, thereby discharging the ink remaining in the head. The ejector discharges ink and a vaporized ink gas to the outside of the mounting portion through the nozzle suction portion and the gas suction portion of the mounting portion. The gas filter removes harmful substance from the gas suctioned from the gas suction portion and removes harmful substance from a gas suctioned from the nozzle suction portion and separated from a gas-liquid separator. The waste liquid container collects a separated liquid suctioned from the nozzle suction portion.

The moving portion includes such as wheels positioned at a lower portion of the head module mounting apparatus, and is configured to move the position of the head module mounting apparatus.

In an ink-jet printer having a replaceable head module according to another embodiment of the present disclosure, all configurations of a general ink-jet printer may be applied within a range that does not impair the characteristics of the present disclosure except for applying the structure of the head assembly that is described above.

In the ink-jet printer having the structure as described above, although the structure in which the head module is capable of being replaced for ink replacement is applied, not all components applied in the conventional ink-jet head are replaced. That is, the minimum number of components such as the head and the reservoir which are in contact with ink and which are required to be replaced together when the ink is replaced, and components such as the gas pressure control device and the head driver are used all the time without being replaced, so that the manufacturing cost may be significantly lowered compared to mounting a gas pressure controller and a control portion on all head modules.

Although the preferred embodiments of the present disclosure have been disclosed for illustrative purposes, those skilled in the art will appreciate that various modifications, additions and substitutions are possible, without departing from the technical idea of the present disclosure. Therefore, the scope of protection of the present disclosure should be determined by the scope of the appended claims, rather than the specific embodiments, and all technical ideas falling within the scope of the claims should be construed as being included in the scope of the present disclosure.

What is claimed is:

1. A head assembly for an ink-jet printer, the head assembly comprising:

a head module modularized such that a head discharging ink and a reservoir storing the ink supplied to the head are included in the head module;

a fixing portion comprising a pressure controller connected to the reservoir and configured to control a gas pressure such that the ink injected into the head maintains a meniscus state, the fixing portion comprising a control driver configured to control the head; and a stage frame on which the head module and the fixing portion are mounted, the stage frame being connected to a moving device and being configured to be moved, wherein the head module is configured such that the head module is capable of being attached to and detached from the stage frame, and connecting portions are respectively formed on portions where the head module and the stage frame contact, so that a pipe and a wiring formed on the head module are connected to a pipe and a wiring which are connected to the fixing portion by coupling the connecting portions and which are inserted into or passing through the stage frame, wherein a linear motion member capable of performing a linear reciprocating motion is mounted on the stage frame, the head module is capable of being mounted on the linear motion member, and whether the connecting portion of the head module and the connecting portion of the stage frame are coupled to each other or not is determined according to a position of the linear motion member on which the head module is mounted.

2. The head assembly of claim 1, wherein the linear motion member is a linear motion guide (LM guide).

3. The head assembly of claim 1, wherein a mounting position of the head module is fixed by at least one of a pin that protrudes on any one of the linear motion member and the head module and by at least one of a pin hole which is formed in the other one of the linear motion member and the head module and into which the pin is inserted.

4. The head assembly of claim 1, wherein a fixing means is provided, in which the fixing means is configured to fix the linear motion member to not be moved when the connecting portion of the head module and the connecting portion of the stage frame are in a state of being coupled to each other.

5. The head assembly of claim 4, wherein the fixing means comprises:

at least one of a pin that protrudes on any one of the head module and the stage frame; and at least one of a pin hole which is formed in the other one of the head module and the stage frame and into which the pin is inserted, and the fixing means is fixed by a zero-point clamping system in which clamping is performed by a hydraulic pressure or a pneumatic pressure.

6. The head assembly of claim 1, wherein the stage frame is divided into a weight dispersion portion and a head mounting portion in which the weight dispersion portion is positioned above a moving portion for moving the head assembly in the ink-jet printer and the head mounting portion is for mounting the head module, and the fixing portion is mounted on the weight dispersion portion.

7. The head assembly of claim 6, wherein the weight dispersion portion has a flat plate shape positioned above the moving portion, and the weight dispersion portion is connected to the head mounting portion via a connecting portion that extends downward from a first side surface of the weight dispersion portion.

8. An ink-jet printer comprising a head assembly discharging ink and a moving portion for moving the head assembly to a discharging position, the head assembly comprising:

a head module modularized such that a head discharging the ink and a reservoir storing the ink supplied to the head are included in the head module;

a fixing portion comprising a pressure controller connected to the reservoir and configured to control a gas pressure such that the ink injected into the head maintains a meniscus state, the fixing portion comprising a control driver configured to control the head; and a stage frame on which the head module and the fixing portion are mounted, the stage frame being connected to a moving device and being configured to be moved, wherein the head module is configured such that the head module is capable of being attached to and detached from the stage frame, and connecting portions are respectively formed on portions where the head module and the stage frame contact, so that a pipe and a wiring formed on the head module are connected to a pipe and a wiring which are connected to the fixing portion by coupling the connecting portions and which are inserted into or passing through the stage frame, wherein a linear motion member capable of performing a linear reciprocating motion is mounted on the stage frame, the head module is capable of being mounted on the linear motion member, and whether the connecting portion of the head module and the connecting portion of the stage frame are coupled to each other or not is determined according to a position of the linear motion member on which the head module is mounted.

9. The ink-jet printer of claim 8, wherein the linear motion member is a linear motion guide (LM guide).

10. The ink-jet printer of claim 8, wherein a mounting position of the head module is fixed by at least one of a pin that protrudes on any one of the linear motion member and the head module and by at least one of a pin hole which is formed in the other one of the linear motion member and the head module and into which the pin is inserted.

11. The ink-jet printer of claim 8, wherein a fixing means is provided, in which the fixing means is configured to fix the linear motion member to not be moved when the connecting portion of the head module and the connecting portion of the stage frame are in a state of being coupled to each other.

12. The ink-jet printer of claim 11, wherein the fixing means comprises:

at least one of a pin that protrudes on any one of the head module and the stage frame; and at least one of a pin hole which is formed in the other one of the head module and the stage frame and into which the pin is inserted, and the fixing means is fixed by a zero-point clamping system in which clamping is performed by a hydraulic pressure or a pneumatic pressure.

13. The ink-jet printer of claim 8, wherein the stage frame is divided into a weight dispersion portion and a head mounting portion in which the weight dispersion portion is positioned above the moving portion for moving the head assembly in the ink-jet printer and the head mounting portion is for mounting the head module, and the fixing portion is mounted on the weight dispersion portion.

14. The ink-jet printer of claim 13, wherein the weight dispersion portion has a flat plate shape positioned above the moving portion, and the weight dispersion portion is connected to the head mounting portion via a connecting portion that extends downward from a first side surface of the weight dispersion portion.

* * * * *